Feb. 20, 1962  G. ALLIMANN  3,022,055
CUTTING DEVICE FOR MACHINES USED IN
MINES, QUARRIES OR WORK-SITES
Filed Aug. 31, 1959  2 Sheets-Sheet 1
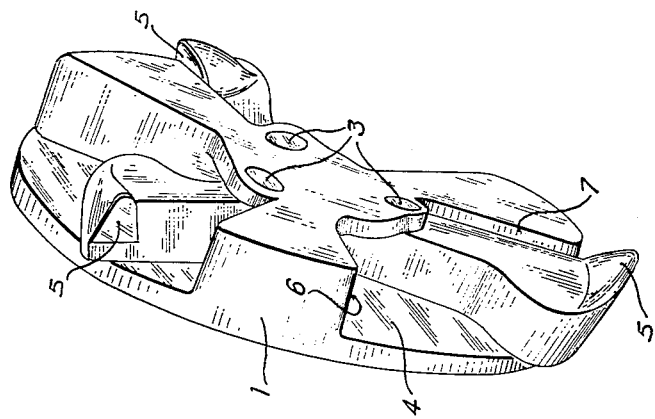
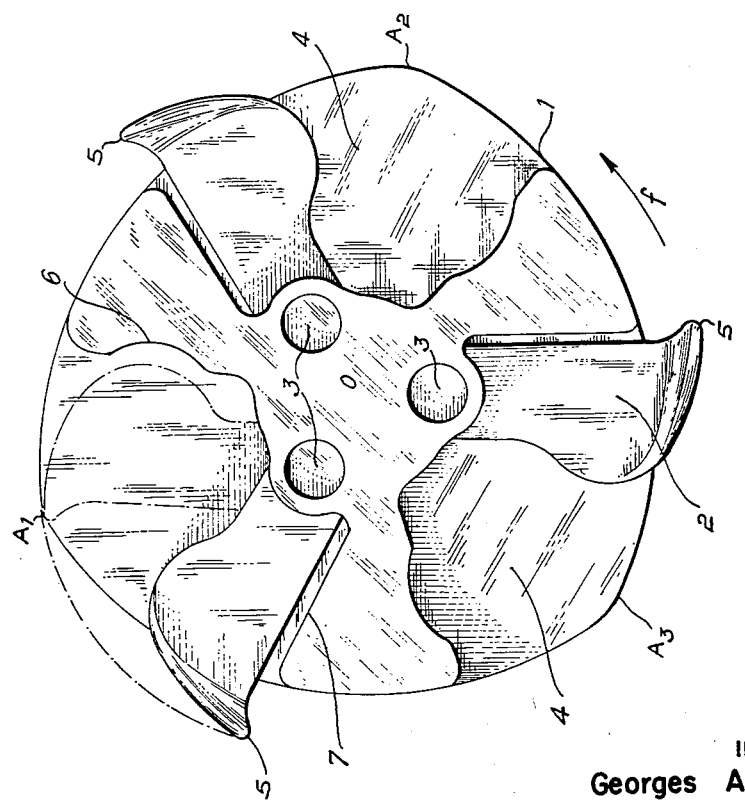
INVENTOR
Georges Allimann
BY Karl W. Flocks
ATTORNEY Feb. 20, 1962

G. ALLIMANN 3,022,055

CUTTING DEVICE FOR MACHINES USED IN
MINES, QUARRIES OR WORK-SITES

Filed Aug. 31, 1959

INVENTOR
Georges Allimann

BY Karl W. Flocks

ATTORNEY

United States Patent Office 3,022,055
Patented Feb. 20, 1962

3,022,055
CUTTING DEVICE FOR MACHINES USED IN MINES, QUARRIES OR WORK-SITES
Georges Allimann, Mulhouse, Haut Rhin, France, assignor to Ateliers de Carspach, Carspach (Haut-Rhin), France, a French company
Filed Aug. 31, 1959, Ser. No. 837,114
Claims priority, application France Sept. 27, 1958
2 Claims. (Cl. 262—19)

The object of the present invention is to provide a mechanical cutting device for machines used in mines, quarries or work-sites.

This device comprises a rotary plate, or simply a rotary hub, provided with picks and inclined to the wall of the rock, whereby each pick strikes one after the other into the material to be cut and is then immediately withdrawn.

The present invention provides a means whereby the pick which strikes into the material to be cut can be withdrawn if, in operation, it meets with a too highly resistant element.

According to the invention, the picks or teeth adapted to strike into the material to be cut consist of pivoting hammers which, when acted upon by centrifugal force, position themselves and strike into the material as a miner's pick would do, and which are capable of being instantaneously withdrawn within a certain perimeter of the plate when the resistance offered by the material is too high.

In accordance with one embodiment, each pick is pivotable, in a recess cut away for it in the surface of said plate, in such a way that, while being supported therein, it may take up a completely retracted position in said recess as well as an operative position which corresponds to the projection of the working portion of the pick beyond the perimeter of the plate.

The radial walls of said recess confine the degree of pivoting of the pick.

The plate's profile is designed to provide for optimum projection and adequate support of the picks.

For certain uses the plate can be replaced by a simple hub provided with eyelets for articulated connection of the pivoting tool-carrying hammers.

Other features and advantages of the present invention will become clear on reading the following description with reference to the accompanying drawings.

In these drawings:

FIGURE 1 is a front view of a cutting plate in accordance with the invention;

FIGURE 2 is a perspective view thereof;

Figure 3:
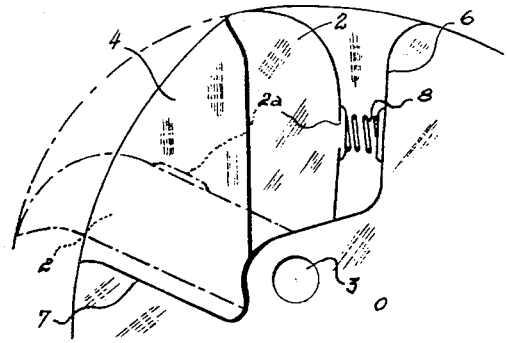
FIGURES 3, 4 and 5 are part views of a plate provided with a hammer assisted by a resilient means.

The cutting device in accordance with the invention comprises a rotary plate 1 adapted to be mounted onto a cutting machine so as to be inclined to the wall of the rock. This arrangement enables each pick 2 carried by the plate to strike one after the other into the material to be cut and then to be immediately withdrawn, in the manner of a pick blow given by a miner.

These picks or teeth 2 carried by the plate pivot on trunnions 3 integral with the plate and constitute hammers which, under the influence of centrifugal force, strike into the material but are capable of being immediately retracted within the plate perimeter if they encounter material offering too high a resistance.

Every pick or hammer 2 pivots in a recess 4 cut away in the surface of the plate and the radial side walls 6 and 7 confine the degree of pivoting of the hammer. The profile of the plate is designed to enable the working portion 5 of each hammer to have optimum projection from the said perimeter, and the hammer to be adequately supported.

In the embodiment illustrated in the drawing, the plate carries three pivoting hammers and it has three bosses A1, A2 and A3 formed on the periphery thereof. Since the trunnions 3 of the pivoting hammers are situated forward of the lines connecting the center O of the plate to the points A1, A2 and A3 (considering the direction of rotation f of the plate), the pivoting hammers can be fully retracted to the rear of said lines. Having passed forward of these lines, the working portion 5 of each hammer projects over the perimeter of the plate and can thus attack the material to be cut.

It will be appreciated that in accordance with the nature and hardness of the material to be cut, the kinetic energy of the hammers which strike into the material can be varied by selecting hammers of different length and weight and by appropriately modifying the speed of the hammer-carrying plate.

The cutting device according to the invention can be provided with a resilient means, the action of which is added to that of centrifugal force, or which entirely replaces this force when the device is operated at low speed.

In the embodiment illustrated in FIGURE 3 the said resilient means consists of a spring 8 secured only to the side wall 6 of the recess 4 and onto which a stop member 2a of the pivoting hammer 2 can bear.

Figure 4:
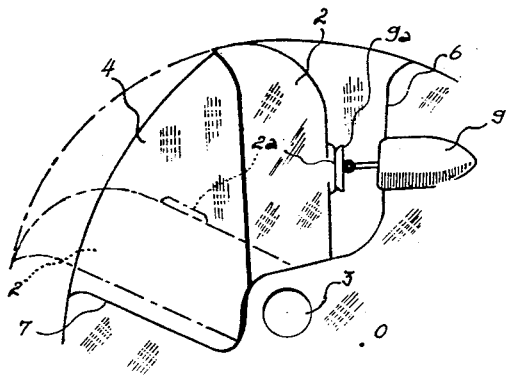

The resilient means consists of a pneumatic piston 9, in FIGURE 4. The pivoting hammer 2, by means of its stop 2a bears against the plunger 9a of the piston.

Figure 5:
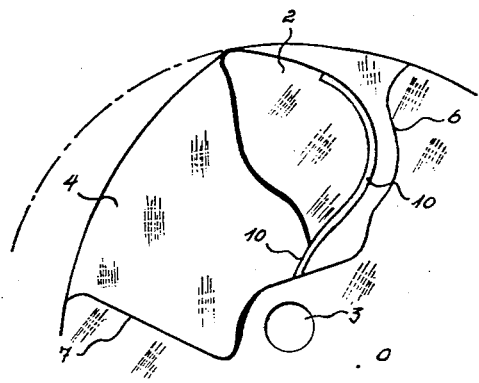

In the embodiment illustrated in FIGURE 5, the pivoting hammers 2 are directly secured to leaf-springs 10.

I claim:

1. A cutting device for use in mines, quarries, or work sites comprising a rotary drilling plate, a top face on said rotary drilling plate having at least one recess therein, a forward side wall, a back side wall, and a bottom wall defining each recess, a pick on said top face connected in each recess and fully retracted in the recess when said plate is at rest, said pick comprising a hammer pivotally connected to said top face and moved forward in the recess in said top face by centrifugal action, and a pressure exerting resilient means having a free end and an opposite end fixed to said back side wall behind said hammer whereby said resilient means is an additive force to the centrifugal action of said hammer, said hammer compressing said resilient means when abutting on the free end.

2. A cutting device for use in mines, quarries, or work sites comprising a rotary drilling plate, a top face on said rotary drilling plate having recesses therein, a forward side wall, a back side wall, and a bottom wall defining each recess, a plurality of picks on said top face with each of said picks connected in one of the recesses and each of said picks fully retracted in a recess when said plate is at rest, each of said picks comprising a hammer pivotally connected to said top face and moved forward in the recess in said top face by centrifugal action, and a pressure exerting resilient means having a free end and an opposite end fixed to said back side wall behind said hammer whereby said resilient means is an additive force to the centrifugal action of said hammer, said hammer compressing said resilient means when abutting on the free end.

References Cited in the file of this patent

UNITED STATES PATENTS

| 287,479 | Smith | Oct. 30, 1883 |
| 1,195,396 | Recen | Aug. 22, 1916 |
| 2,336,487 | Lewis et al. | Dec. 14, 1943 |
| 2,691,511 | Lindquist | Oct. 12, 1954 |